Figure 1:
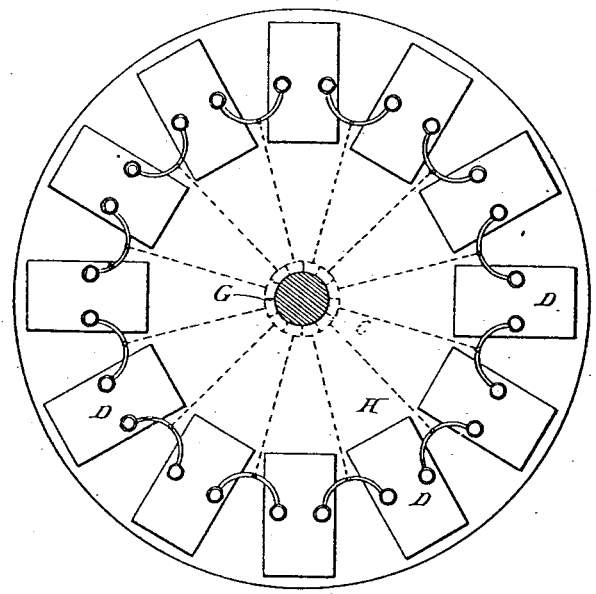

(No Model.)  2 Sheets—Sheet 1.

H. S. MAXIM.
METHOD OF AND APPARATUS FOR FORMING STORAGE BATTERIES.

No. 264,952. Patented Sept. 26, 1882.

Attest:
R. F. Barnes
W. Fitsby

Inventor:
Hiram S. Maxim
By Parker W. Page
Atty.

(No Model.) 2 Sheets—Sheet 2.
H. S. MAXIM.
METHOD OF AND APPARATUS FOR FORMING STORAGE BATTERIES.
No. 264,952. Patented Sept. 26, 1882.
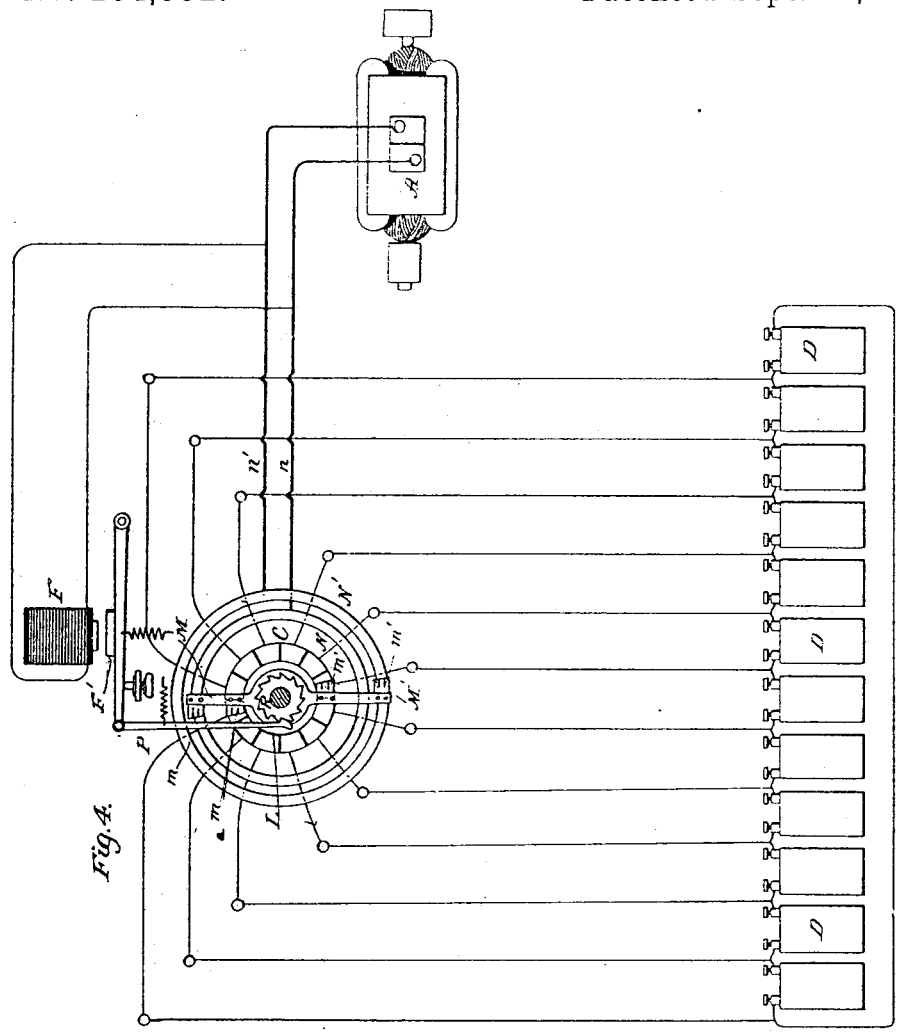
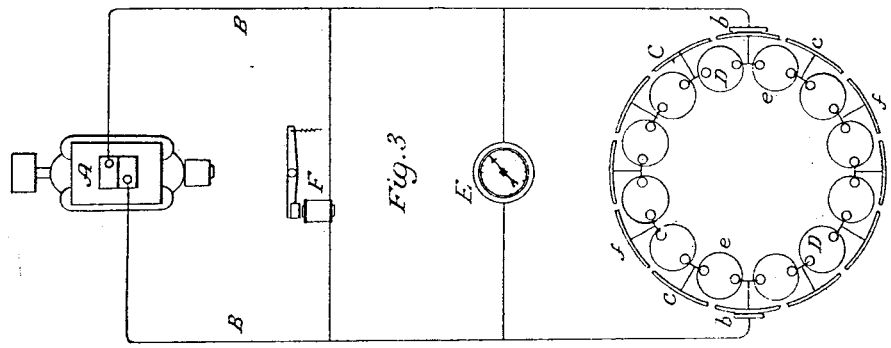
Attest:
R. F. Barnes
W. Frisby
Inventor:
Hiram S. Maxim
By Parker W. Page
Atty.

UNITED STATES PATENT OFFICE.

HIRAM S. MAXIM, OF LONDON, ENGLAND.

METHOD OF AND APPARATUS FOR "FORMING" STORAGE-BATTERIES.

SPECIFICATION forming part of Letters Patent No. 264,952, dated September 26, 1882.

Application filed April 15, 1882. (No model.)

*To all whom it may concern:*

Be it known that I, HIRAM S. MAXIM, a citizen of the United States, at present residing at London, England, have invented certain new and useful Improvements in Methods of and Apparatus for Preparing or "Forming" Storage-Batteries, of which the following is a specification, reference being had to the drawings accompanying and forming a part of the same.

My invention relates to the batteries variously known as "secondary" or "storage" batteries, or "electric accumulators." Such batteries, in the most practicable form as now known, consist in the main of leaden plates or electrodes contained within a cell of electrolytic fluid, such as dilute sulphuric acid. Such batteries have no power of generating a current until the plates are brought into electro-positive and electro-negative conditions, respectively, which is done by passing a current from an external source through the cell, thereby forming on one of the plates (the anode) a deposit of peroxide of lead, which is strongly electro-negative to metallic lead and to the hydrogen which attaches itself to the other plate; but the current which a battery thus treated is capable of producing is very slight and transient. If, however, the cell be again charged, and in an opposite direction, the other plate, now become the anode, receives a similar deposit of peroxide of lead, and a greater amount of energy may thus be stored. In practice it is found necessary to repeat these operations of charging and discharging a great number of times before the battery is capable of storing any considerable amount of energy, and this is greatly facilitated by passing a current through the battery alternately in opposite directions. This process or preparation is technically known as "forming," and may be considerably shortened by applying mechanically to the plates, before charging the battery, a coating of red lead or similar substance, which in the subsequent process of forming is reduced gradually on one plate to the metallic state, and on the other assumes the condition of peroxide.

The operation of forming by alternately charging and discharging is attended with many difficulties, as will appear from the following considerations. If a number of cells be connected with a dynamo-electric machine and the latter set in operation, the current at first will be very strong, owing to the slight resistance of the circuit. The machine will be practically on short circuit and will run very hard. After a short interval the battery acquires the power of generating a current opposed to that charging it, the opposition growing stronger and stronger, and the amount of current flowing being greatly reduced thereby. The next step is to pass a current through the battery in an opposite direction, so that for a time both the machine and battery are working in the same direction—a condition even more detrimental to the machine than when running on short circuit. Again, after the battery has been recharged the current is reversed, and all the energy stored in the previous operation is wasted. This process is repeated a number of times, the accumulated energy in each case being wasted, and only manifesting itself by heating the coils of the machine. To avoid these difficulties in the process of forming, I have devised a method of charging and discharging a number of cells simultaneously, in which the effects of wide variations in resistance and counter electro-motive force are obviated, and in which but little useful current is wasted.

The principles upon which my improved system is based, and the methods and apparatus by which the same is or may be carried into effect, will be understood by the following description and the accompanying drawings, in which—

Figure 2:
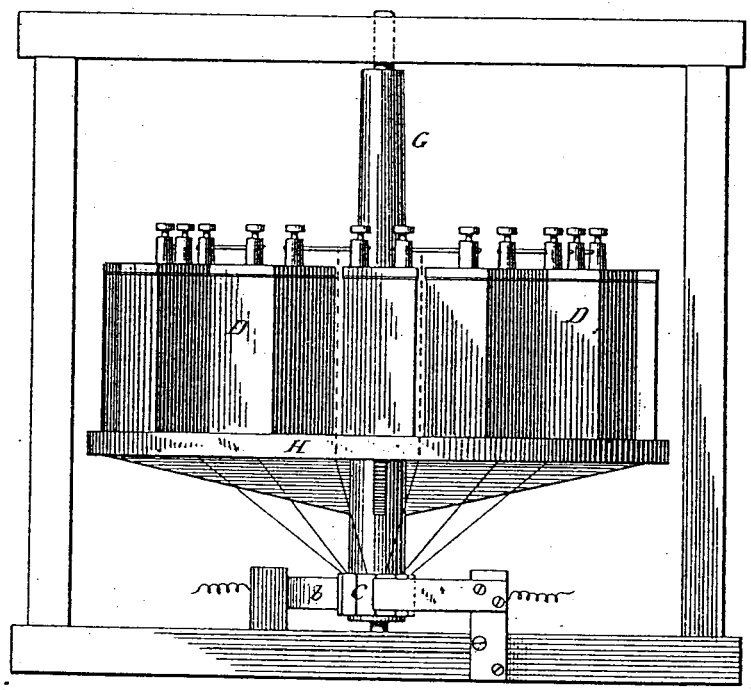

Figure 1 is a plan view of a device for forming a number of cells; Fig. 2, an elevation of the same; Fig. 3, a theoretical illustration of the principles involved in the system, and Fig. 4 a diagrammatic illustration of an apparatus for automatically charging and discharging any desired number of cells.

Referring to Fig. 3, I have here shown a dynamo-electric machine, A, circuit-wires B B leading therefrom and ending in contact-plates or brushes $b$ $b$. These are to be arranged to bear on a ring of insulated plates, C, to which cells to be formed corresponding in number to the plates C are connected in the following manner: The cells are first connected in an endless series; or, in other words, the whole number of cells are coupled to form a complete ring. Then from the conductors forming the connections between the several cells wires are led to the plates C, as shown. Let the machine be now started. A current will flow through the circuit, passing between the two plates or brushes b b, through that pair of the plates C C with which the brushes are in contact, and branching through the series of cells D, one half of the cells being charged thereby in an opposite direction to the other. When the current is first started it has but little resistance and no counter-current to overcome. At the start, therefore, the machine runs hard; but in a short time the counter electro-motive force developed by the cells opposes that of the machine, the effect being, in some senses, equivalent to inserting a resistance in the circuit. The current is passed in this direction until the desired charge is imparted to the ring of cells. This may be ascertained by the deflection of a galvanometer, E, placed in a circuit of high resistance between the conductors B B. If, now, the brushes b b be carried onto the next adjacent pair of plates, as c c, the current, as before, divides between the two halves of the ring; but one cell, as e e, in each half is now adding its current to that of the machine, while all the rest remain as before. The opposition or resistance is thus determined by two causes. Less opposition is offered, for the reason that there are fewer cells in condition to give a counter-current, and two cells are now assisting the machine by furnishing a current in the same direction as that generated by the machine. When these two assisting-cells have expended their charge the current from the machine charges them in contrary direction, so that they in turn set up a counter electro-motive force. The opposition or resistance being in this manner again increased, the brushes b b are brought in contact with the next pair of plates, as f f. Here the same conditions exist as before. Two powerfully-charged cells are brought in to assist the machine-current, and the combined currents pass through the remaining cells until the two assisting-cells are exhausted, after which the current is kept up until they are charged in a contrary direction. This process is continued until all the cells are properly formed.

The principle of this system of forming may be embodied in a variety of apparatus, two general types of which are herein illustrated. The opposing current developed by the cells operates, as above stated, in many respects the same as a dead resistance. If, therefore, a galvanometer, E, be included in a cross-circuit of high resistance, it will be the more deflected as the counter-current increases. In this way not only a reliable indication of the amount of charge may be obtained, but if an electro-magnet, as F, be included in a similar cross-circuit it may be utilized to impart to the cells or the brushes the requisite movement, when the opposition or resistance causes a given amount of current to flow through the coils of said magnets, and thus the charging of the cells may be effected automatically.

In practice I design using apparatus constructed as shown in Figs. 2 or 4. In the first case I construct a frame in which is pivoted a vertical spindle, G, carrying a table, H. On this latter are arranged any desired number of cells to be charged. They are then connected up in continuous series and the connecting-wires brought into electrical connection with the insulated segments of a commutator conveniently placed on the spindle G. The plan of connecting the cells together and to the commutator, in this as in the other instances, it will be observed, is similar to that followed in the case of a Gramme armature, supposing the cells to be the coils or sections of the armature-conductor. Brushes b b, forming the terminals of a circuit containing a dynamo electric machine or other suitable source of electricity, are caused to bear on the commutator. In this apparatus the table supporting the cells is to be turned at the proper times, while the brushes remain stationary. The turning may be done by an attendant or automatically by the employment of an electro-magnet and suitable appurtenances, as will be understood by reference to Fig. 4. Here I have shown a number of cells D, placed in any preferred position or order, but connected together and to the insulated segments of a stationary commutator, C, in the same manner as before described with reference to the other figures. The plates of the commutator are arranged concentrically with the shaft L, to which arms M M', of insulating material, are fixed. N N' are two metal rings concentric with the commutator and the shaft, and connected respectively with the wires n n' from a dynamo-machine or battery. On arm M are two brushes, m m, electrically connected, one in position to bear on ring N, the other on the plates of the commutator. On arm M' are two similar brushes, m' m', bearing on the ring N' and the commutator, respectively. In a circuit formed between the wires n n' is an electro-magnet, F, having an adjustable armature, F', and connected directly with or otherwise operating a pawl, P, engaging with a ratchet, R, on the shaft L, the number and position of the ratchet-teeth corresponding with the number and position of the plates of the commutator.

The operation of an apparatus thus constructed is as follows: When the machine is started a current flows through the rings N N', brushes m m', the commutator with which the said brushes are in contact, and the series of battery-cells. A small amount of current is also diverted through the circuit of magnet F, not sufficient, however, to cause the magnet to move the adjusted armature. As the counter electro-motive force in the cells is developed the amount of current passing through coils of magnet F is increased until this latter becomes sufficiently energized to draw up the armature F', and thereby turn the shaft L one step. This shifts the brushes m m' onto the next adjacent commutator-plates and brings two cells of the battery to the assistance of the machine, as previously explained, and so, for the whole process of forming, the magnet and its armature may be made to effect the requisite movement of the brushes or the commutator.

I have described what I now consider the most convenient and practicable apparatus for carrying out my invention. I would, however, state that I do not consider the invention as restricted by any special form of the mechanical appliances that are or may be used for carrying the same into effect. Though describing specific forms, I may use any other by which are attained the objects which I have in view, which are mainly to equalize, as far as possible, the load on the machine, to avoid waste of energy, and to afford an easy and convenient method of charging or forming a number of cells, this method, in general terms, being first to pass a current through two branches of a circuit, each containing an equal number of cells, until the cells are charged, then to transfer a cell or cells from each branch to the other, connecting them with the external circuit and the cells in such manner that the current which they evolve will be in the same direction as that in the external circuit, and keeping them in this condition until the two series are charged, then to repeat the same operation by the transfer of other cells from one branch of the circuit to the other, until all the cells have been charged and recharged a sufficient number of times to effect the necessary deposit of oxide on the plates to give good practical results.

It follows from the above-described method of forming cells that practically the same results may be obtained by reversing the polarity of one or more cells in each branch of the circuit instead of transferring the cells in the manner described. If this be done, as by employing a reversing commutator or switch with each cell, or by simply shifting the connections, it is not necessary to use a branched circuit or to connect the cells up in endless series, as they may be arranged in simple series with the generator. This, though forming a part my invention, I do not deem the most convenient method.

Having now described my invention, what I claim is—

1. The improvement in the art of forming the plates of secondary or storage batteries, which consists in causing successively parts of a series of cells that are charged in the same direction to act in conjunction with the current from an external source for the purpose of forming the others without waste of energy, as set forth.

2. The method of forming the plates of secondary or storage batteries by first passing a current from an electrical generator through branches of a circuit, each containing an equal number of cells, until the same are charged, then causing the current of one or more cells in each branch to flow in the same direction as that of the generator by reversal of connections or transfer of the cells, as described, and repeating such reversal or transfer of all the cells successively until all are formed, as set forth.

3. The method of forming secondary or storage batteries, which consists in connecting up independent cells in a multiple series, and passing through the series a current from an external circuit, containing a generator of electricity by connecting the terminals of said circuit with all the cells successively, substantially as and for the purpose set forth.

4. The combination, with a group of secondary or storage cells, of conductors joining the same in an endless series, a commutator composed of insulated segments or plates, and connections from the same to the joining-conductors, substantially as described.

5. The combination, with a group of secondary or storage cells, of conductors joining the same in an endless series, and a commutator to the insulated segments of which the joining-conductors are connected, and bearing brushes connected with a circuit from an electrical generator, the said commutator or brushes being arranged to revolve, substantially as and for the purpose set forth.

6. The combination of a group of secondary or storage cells connected together in endless series, and to the segments or plates of a commutator, as described, bearing brushes forming the terminals of a circuit from an electrical generator, an electro-magnet included in a derived circuit, and mechanism connected with and operated by said magnet for the purpose of revolving the commutator or the brushes, substantially as and for the purpose set forth.

In testimony whereof I have hereunto set my hand this 29th day of March, 1882.

HIRAM S. MAXIM.

Witnesses:
 FREDERIC WILLOUGHBY,
 AUG. L. PICAUD,
*Clerks to Messrs. Comerford & Co., Public Notaries, No. 7 Tokenhouse Yard, London.*